(12) United States Patent
Chuang et al.

(10) Patent No.: US 12,541,229 B2
(45) Date of Patent: Feb. 3, 2026

(54) MANAGING SENSOR STATES OF AN INFORMATION HANDLING SYSTEM

(71) Applicant: Dell Products L.P., Round Rock, TX (US)

(72) Inventors: Yu-Hao Chuang, Taoyuan (TW); Chen-Hsin Chang, Keelung (TW); Yaotsung Chang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 420 days.

(21) Appl. No.: 18/338,532

(22) Filed: Jun. 21, 2023

(65) Prior Publication Data

US 2024/0427385 A1 Dec. 26, 2024

(51) Int. Cl.
*G06F 1/16* (2006.01)

(52) U.S. Cl.
CPC .......... *G06F 1/1681* (2013.01); *G06F 1/1677* (2013.01); *G06F 1/1684* (2013.01)

(58) Field of Classification Search
CPC ..... G06F 1/1681; G06F 1/1677; G06F 1/1684
See application file for complete search history.

(56) References Cited

U.S. PATENT DOCUMENTS

| 2012/0045196 A1* | 2/2012 | Takahashi | H04N 23/51 396/374 |
| 2020/0387197 A1* | 12/2020 | Itoh | G06F 1/1656 |
| 2021/0011520 A1* | 1/2021 | Bhat | G06F 1/1679 |

* cited by examiner

*Primary Examiner* — Zhipeng Wang
(74) *Attorney, Agent, or Firm* — McDermott Will & Schulte LLP

(57) ABSTRACT

Managing sensor states of an IHS, including detecting, at a first time, a first static state of a first body and a second body of the IHS, the first body coupled to the second body; in response to detecting the first static state of the first body and the second body of the IHS: receiving, from a first sensor of a pair of sensors of the IHS, a first signal, determining, based on the first signal, a first positional state of the first body with respect to the second body of the IHS, disabling the second sensor from the pair of sensors; detecting, at a second time after the first time, a rotation of the first body with respect to the second body; in response to detecting the rotation of the first body with respect to the second body: enabling the second sensor from the pair of sensors.

20 Claims, 12 Drawing Sheets

MANAGING SENSOR STATES OF AN INFORMATION HANDLING SYSTEM

BACKGROUND

Field of the Disclosure

The disclosure relates generally to an information handling system, and in particular, managing sensor states of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing sensor states of an information handling system, including: detecting, at a first time, a first static state of a first body and a second body of the information handling system, the first body coupled to the second body via a hinge; in response to detecting the first static state of the first body and the second body of the information handling system: receiving, from a first sensor of a pair of sensors of the information handling system, a first signal, determining, based on the first signal, a first positional state of the first body with respect to the second body of the information handling system, and disabling the second sensor from the pair of sensors; detecting, at a second time after the first time, a rotation of the first body with respect to the second body; in response to detecting the rotation of the first body with respect to the second body: enabling the second sensor from the pair of sensors; and detecting, at a third time after the second time, a second static state of the first body and the second body of the information handling system; in response to detecting the second static state of the first body and the second body of the information handling system: receiving, from the second sensor of the pair of sensors, a second signal; determining, based on the second signal, a second positional state of the first body with respect to the second body of the information handling system; and disabling the first sensor from the pair of sensors.

Other embodiments of these aspects include corresponding systems, apparatus, and computer programs, configured to perform the actions of the methods, encoded on computer storage devices.

These and other embodiments may each optionally include one or more of the following features. For instance, in response to detecting the rotation of the first body with respect to the second body, maintaining the first sensor as enabled. Detecting, at a fourth time after the second time and before the third time, a third static state of the first body and the second body; in response to detecting the third static state of the first body and the second body: disabling the first and the second sensors. Wherein the first positional state of the first body with respect to the second body includes a closed positional state of the information handling system, and wherein the second positional state of the first body with respect to the second body includes a tablet positional state of the information handling system. Wherein the first positional state of the first body with respect to the second body includes a tablet positional state of the information handling system, and wherein the second positional state of the first body with respect to the second body includes a closed positional state of the information handling system. Receiving the first signal further includes receiving the first signal indicating a detection of a first magnetic field at the first sensor. Receiving the second signal further includes receiving the second signal indicating a detection of a second magnetic field at the second sensor.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
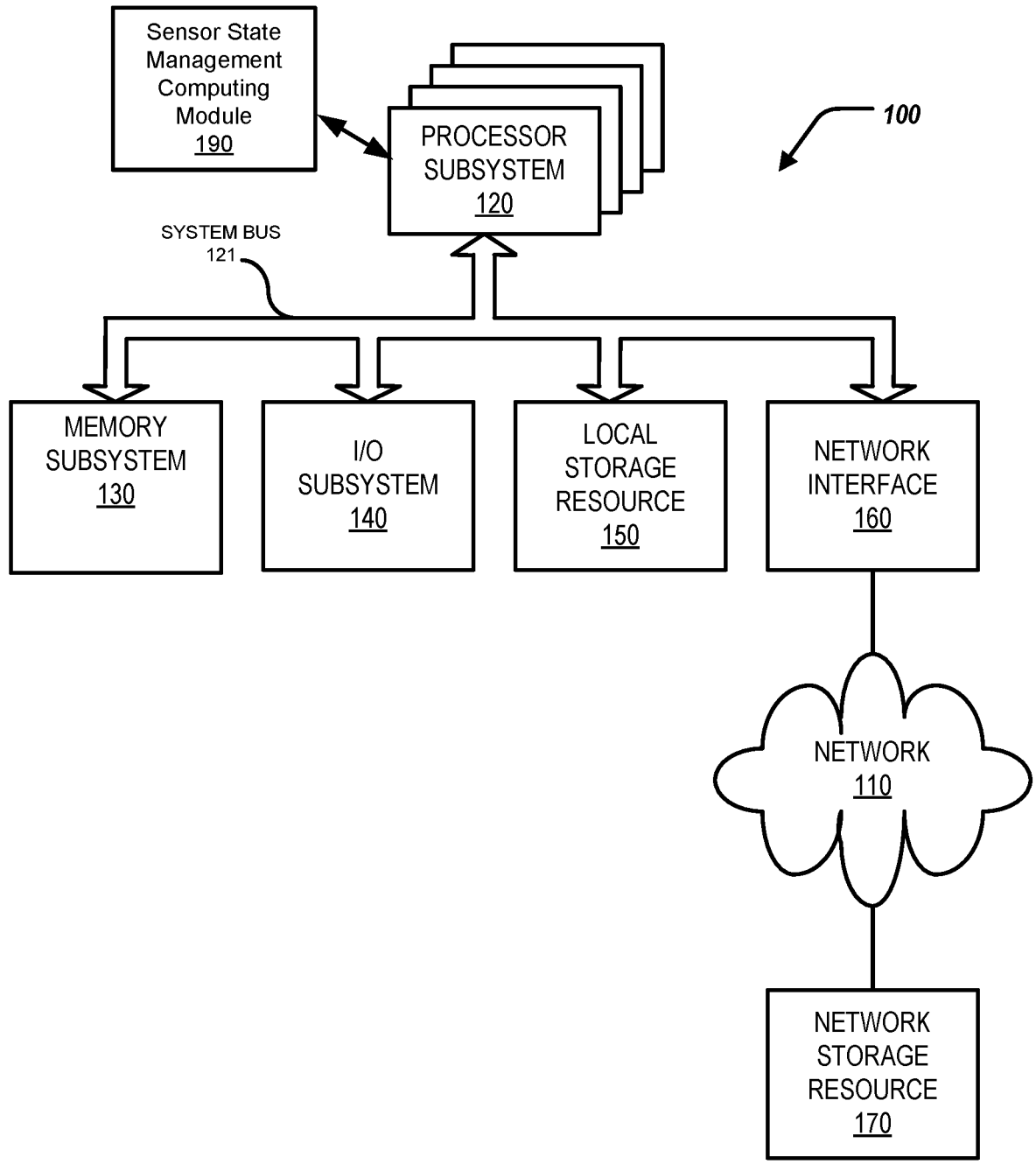
FIG. 1 is a block diagram of selected elements of an embodiment of an information handling system.

This disclosure discusses methods and systems for managing sensor states of an information handling system. In short, sensors that detect a positional state of bodies of the information handling system can be staggered. This can provide more accurate control of the sensors, and can minimize unintended activation of the sensors.

Specifically, this disclosure discusses a system and a method for managing sensor states of an information handling system, including detecting, at a first time, a first static state of a first body and a second body of the information handling system, the first body coupled to the second body via a hinge; in response to detecting the first static state of the first body and the second body of the information handling system: receiving, from a first sensor of a pair of sensors of the information handling system, a first signal, determining, based on the first signal, a first positional state of the first body with respect to the second body of the information handling system, and disabling the second sensor from the pair of sensors; detecting, at a second time after the first time, a rotation of the first body with respect to the second body; in response to detecting the rotation of the first body with respect to the second body: enabling the second sensor from the pair of sensors; and detecting, at a third time after the second time, a second static state of the first body and the second body of the information handling system; in response to detecting the second static state of the first body and the second body of the information handling system: receiving, from the second sensor of the pair of sensors, a second signal; determining, based on the second signal, a second positional state of the first body with respect to the second body of the information handling system; and disabling the first sensor from the pair of sensors.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-10 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a sensor state management computing module 190. The sensor state management computing module 190 can be included by the processor subsystem 120, or included by the processor subsystem 120. In some examples, the sensor state management computing module 190 can be included by an embedded controller (EC), or in communication with an ED.

In short, the sensor state management computing module 190 can stagger use of sensors that detect a positional state of bodies of the information handling system 100. This can provide more accurate control of the sensors, and can minimize unintended activation of the sensors.

Figure 2:
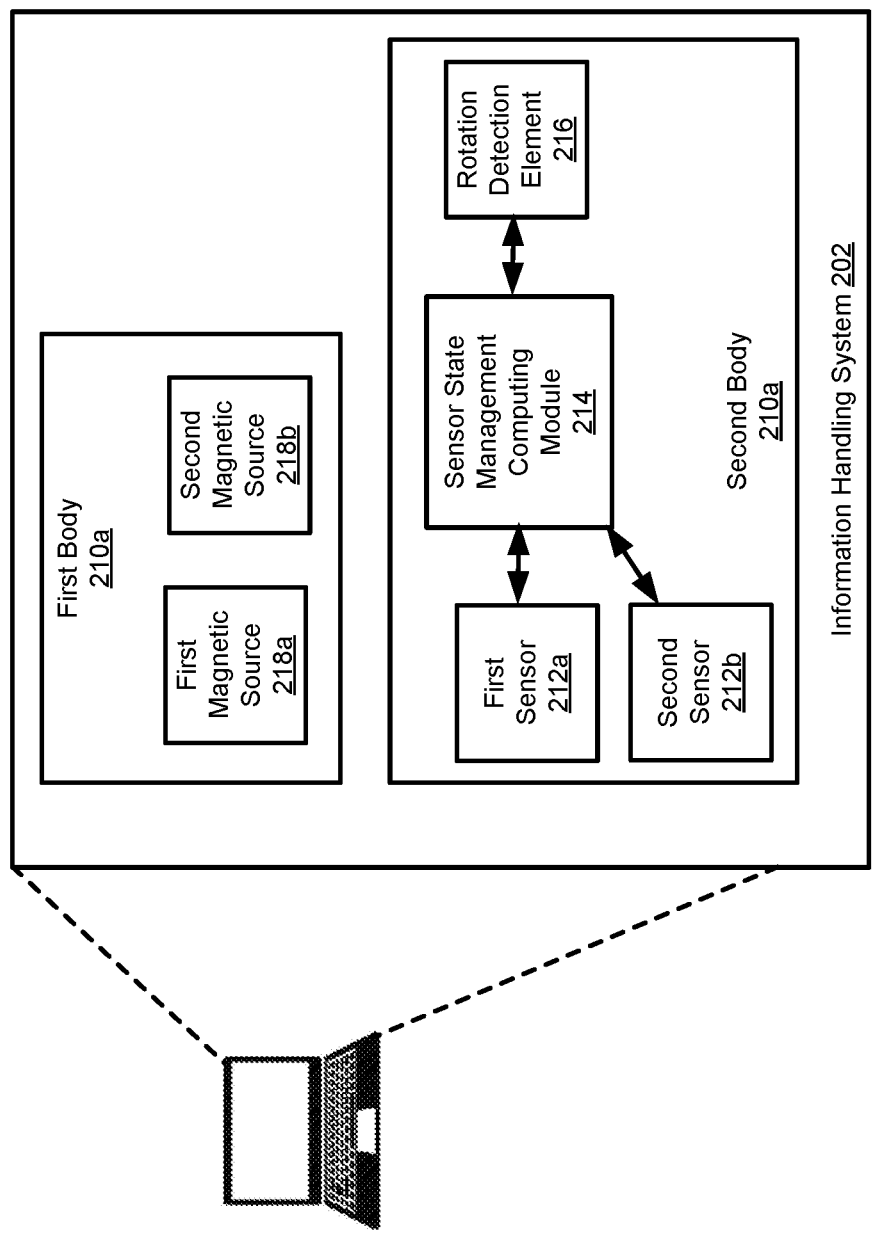
FIG. 2 illustrates a block diagram of an information handling system for managing sensor states of the information handling system.

Turning to FIG. 2, FIG. 2 illustrates an environment 200 including an information handling system 202. The information handling system 202 can include a first body 210a and a second body 210b (collectively referred to as bodies 210). In some examples, the information handling system 202 is similar to, or includes, the information handling system 100 of FIG. 1.

The first body 210a can include a first magnetic source 218a and a second magnetic source 218b (collectively referred to as magnetic sources 218).

The second body 210b can include a first sensor 212a and a second sensor 212b (collectively referred to as sensors 212). The second body 210b can further include a sensor management computing module 214 and a rotation detection element 216. In some examples, the sensor management computing module 214 is the same, or substantially the same, as the sensor management computing module 190 of FIG. 1. The sensor state management computing module 214 can be in communication with the sensors 212 and the rotation detection element 216. In some examples, the sensors 212 are Hall effect sensors. In some examples, the sensors 212 are giant magnetoresistance (GMR) sensors.

Figure 3A:
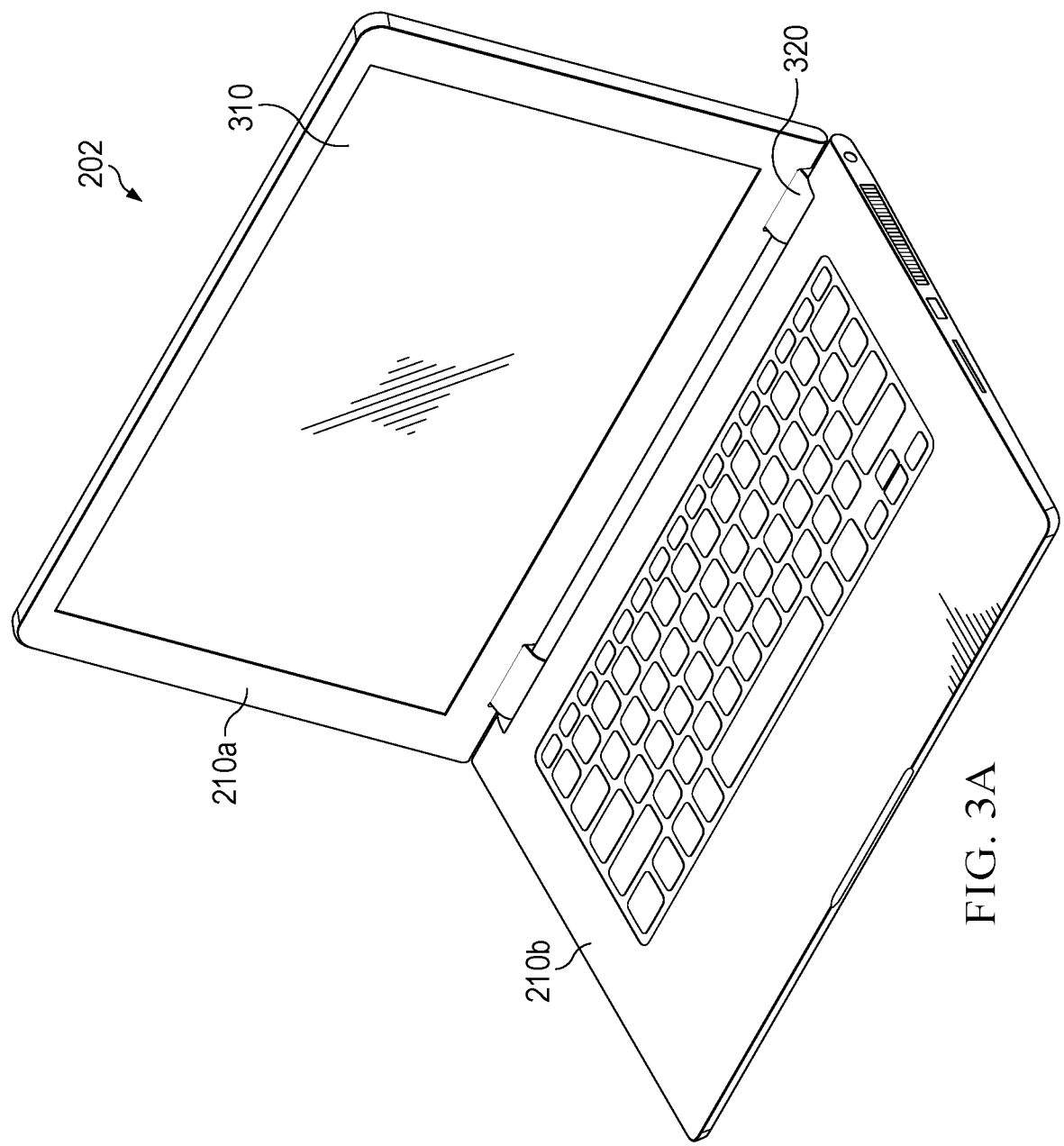
FIG. 3A illustrates a perspective view of the information handling system in an open positional state (table-top positional state).

Turning to FIG. 3A, FIG. 3A illustrates a perspective view of the information handling system 202, in an open positional state (table-top positional state). The information handling system 202 can include the first body 210a and the second body 210b. The first body 210a can include a display 310. A hinge 320 can couple the first body 302a to the second body 320b. When the information handling system 202 is in the open state, the first body 210a is rotated with respect to the second body 210b about the hinge 320 to define an angle between the first body 210a and the second body 210b.

Figure 3B:
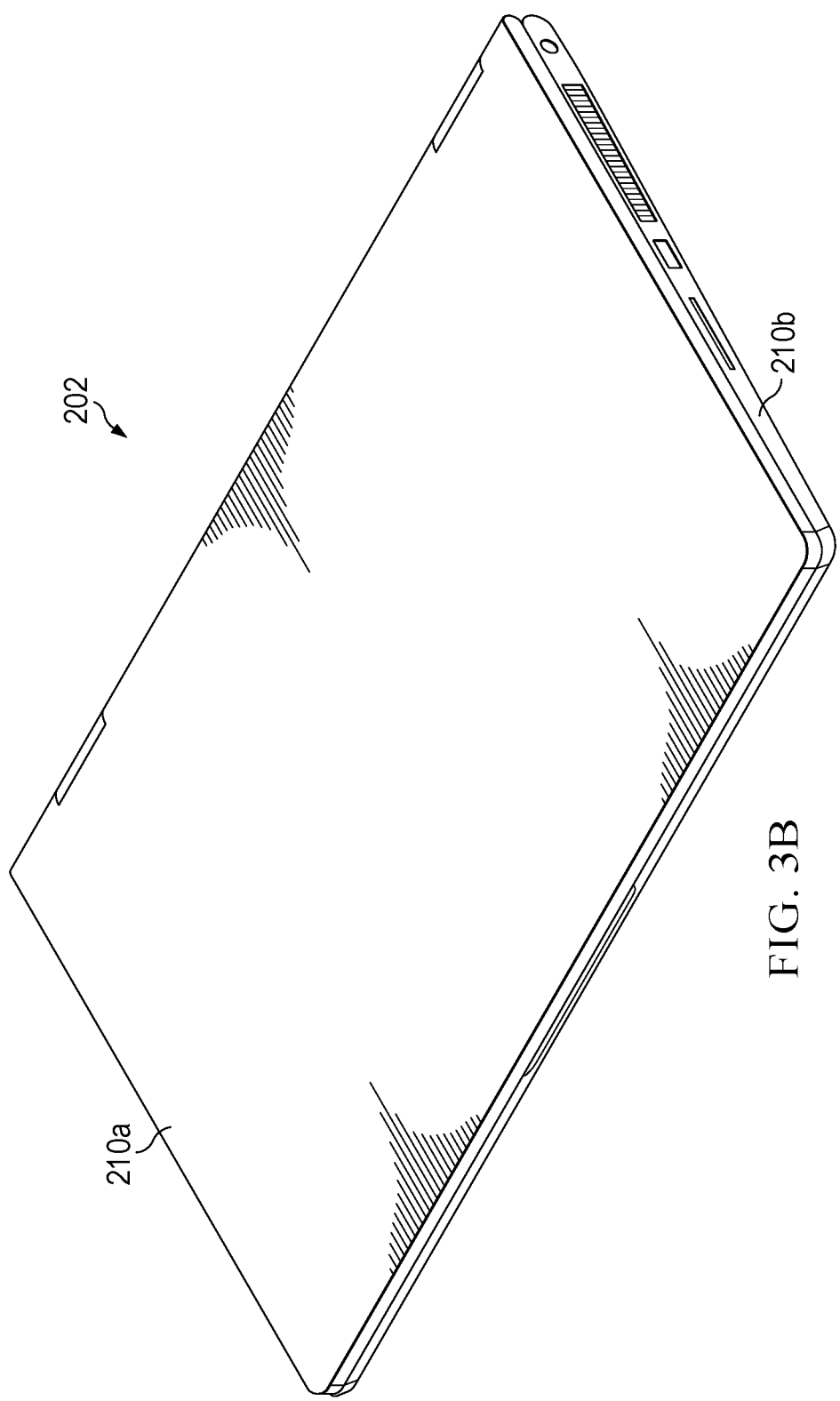
FIG. 3B illustrates a perspective view of the information handling system in a closed positional state.

FIG. 3B illustrates a perspective view of the information handling system 202, in a closed positional state. When the information handling system 202 is in the closed positional state, the first body 210a is adjacent to the second body 210b such that there is a zero degree angle between the first body 302a and the second body 302b.

Figure 3C:
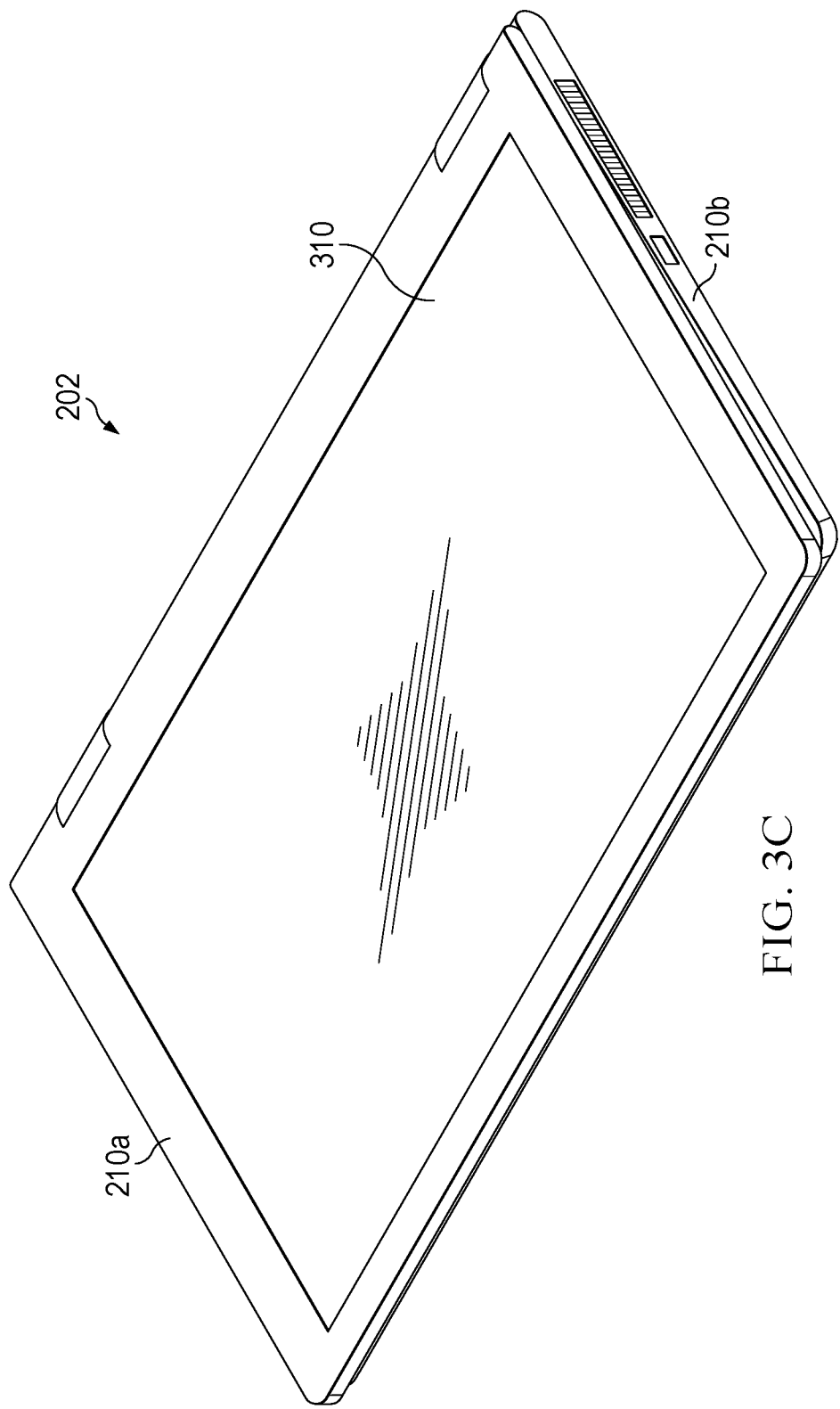
FIG. 3C illustrates a perspective view of the information handling system in a tablet positional state.

FIG. 3C illustrates a perspective view of the information handling system 202, in a tablet positional state. When the information handling system 202 is in the tablet positional state, the first body 210a is adjacent to the second body 210b such that there is a zero degree angle between the first body 302a and the second body 302b; and the display 310 is accessible by a user of the information handling system 202. That is, the display 310 is positioned facing away from the second body 210b.

Figure 4:
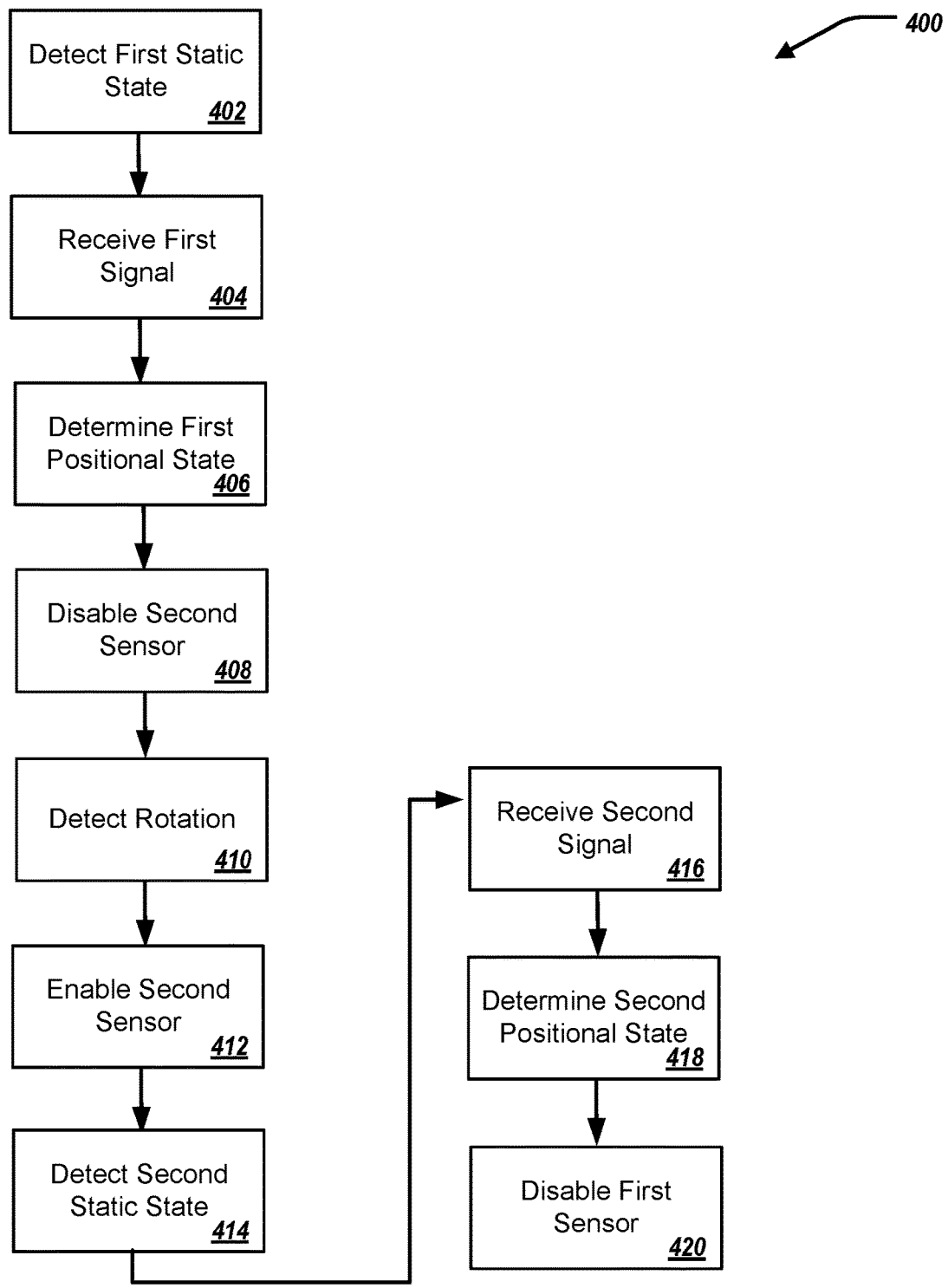
FIG. 4 illustrates a method for managing sensor states of the information handling system, in a first embodiment.

FIG. 4 illustrates a flowchart depicting selected elements of an embodiment of a method 400 for managing sensor states of an information handling system. The method 400 may be performed by the information handling system 100, the information handling system 202 and/or the sensor state management computing module 210, and with reference to FIGS. 1-3 and 5-9. It is noted that certain operations described in method 400 may be optional or may be rearranged in different embodiments.

The rotation detection element 216 detects, at a first time, a first static state of the first body 210a and the second body 210b, at 402. For example, when the rotation detection element 216 includes a gyroscope, the gyroscope detects zero, or substantially zero, angular velocity of the first body 210a and the second body 210b. That is, the first body 210a is static with respect to the second body 210b, and the second body 210b is static with respect to the first body 210a. The rotation detection element 216 can provide a signal to the sensor state management computing module 214 indicating, at the first time, the first static state of the first body 210a and the second body 210b.

In response to detecting the first static state of the first body 210a and the second body 210b, the sensor state management computing module 214 receives, from the first sensor 212a, a first signal, at 404. Specifically, the first sensor 212a detects a first magnetic field at the first sensor 212a. In particular, the first sensor 212a detects the first magnetic source 218a, and specifically, detects the first magnetic field of the first magnetic source 218a. In some examples, the first sensor 212a detects the first magnetic source 218a, and specifically, detects the first magnetic field of the first magnetic source 218a when the first magnetic source 218a is within a threshold distance of the first sensor 212a. The first sensor 212a provides the first signal to the sensor state management computing module 214 indicating the detection of the first magnetic source 218a.

Figure 5:
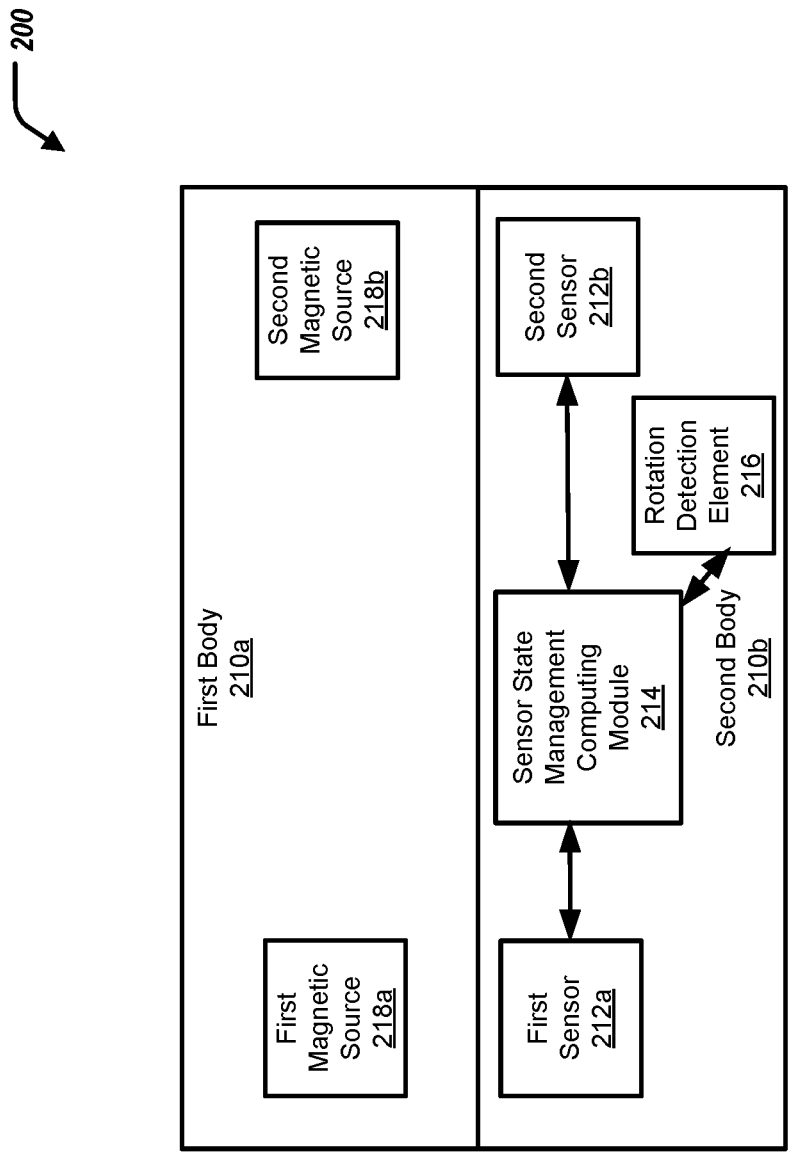
FIGS. 5-9 illustrate respective positional states of the information handling system.

Further in response to detecting the first static state of the first body 210a and the second body 210b, the sensor state management computing module 214 determines, based on the first signal, a first positional state of the first body 210a with respect to the second body 210b, at 406. That is, when the first sensor 212a provides the first signal, and the first body 210a and the second body 210b are in the first static state, the sensor state management computing module 214 determines that the first body 210a is in the first positional state with respect to the second body 210b. That is, when the first sensor 212a provides the first signal indicating detection of the first magnetic source 218a, and the first body 210a and the second body 210b are in the first static state, the sensor state management computing module 214 determines that the first body 210a is in the first positional state with respect to the second body 210b. In some examples, the first positional state of the first body 210a with respect to the second body 210b can include a closed positional state of the information handling system 202. FIGS. 3B and 5 illustrate the closed positional state of the information handling system 202, and in particular, the first body 210a adjacent to the second body 210b such that there is a zero degree angle between the first body 210a and the second body 210b. Furthermore, in the closed positional state of the information handling system 202, the first sensor 212a is proximate to the first magnetic source 218a.

Further in response to detecting the first static state of the first body 210a and the second body 210b, the sensor state management computing module 214 disables the second sensor 212b, at 408. That is, the second sensor 212b is disabled from detecting any magnetic field, or from detecting the second magnetic source 218b. In some examples, the second sensor 212b is placed in an off-state to disable the second sensor 212b.

The rotation detection element 216 detects, at a second time after the first time, a rotation of the first body 210a and the second body 210b, at 410. For example, when the rotation detection element 216 includes a gyroscope, the gyroscope detects angular velocity of the first body 210a and/or the second body 210b. That is, the first body 210a is rotated with respect to the second body 210b, and/or the second body 210b is rotated with respect to the first body 210a. The rotation detection element 216 can provide a signal to the sensor state management computing module 214 indicating, at the second time, rotation of the first body 210a with respect to the second body 210b.

In response to detecting the rotation of the first body 210a with respect to the second body 210b, the sensor state management computing module 214 enables the second sensor 212b, at 412. That is, the second sensor 212b is enabled for detecting of a magnetic field, and in particular, detecting the second magnetic source 218b. In some examples, the second sensor 212b is placed in an on-state to enable the second sensor 212b.

Furthermore, in some examples, in response to detecting the rotation of the first body 210a with respect to the second body 210b, the sensor state management computing module 214 maintains the first sensor 212a as enabled. That is, the first sensor 212a is maintained as enabled for detecting of a magnetic field, and in particular, detecting the first magnetic source 218a. In some examples, the first sensor 212a is maintained in the on-state to maintain the first sensor 212a as enabled.

Figure 6:
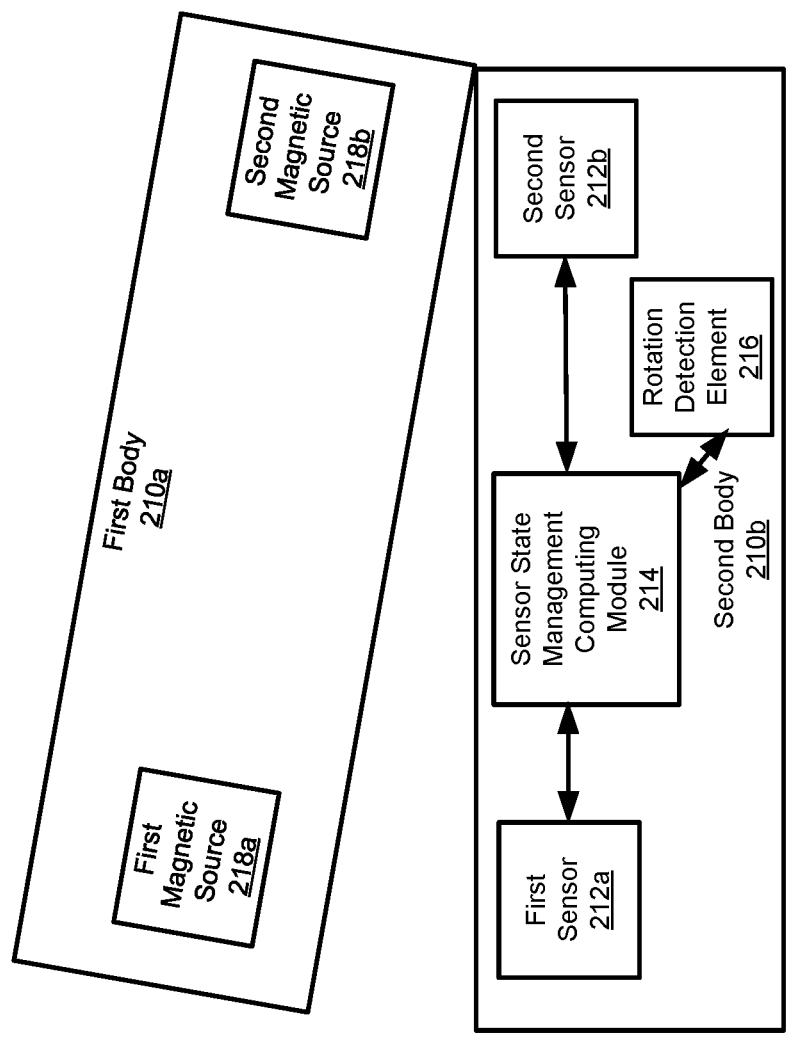
Figure 7:
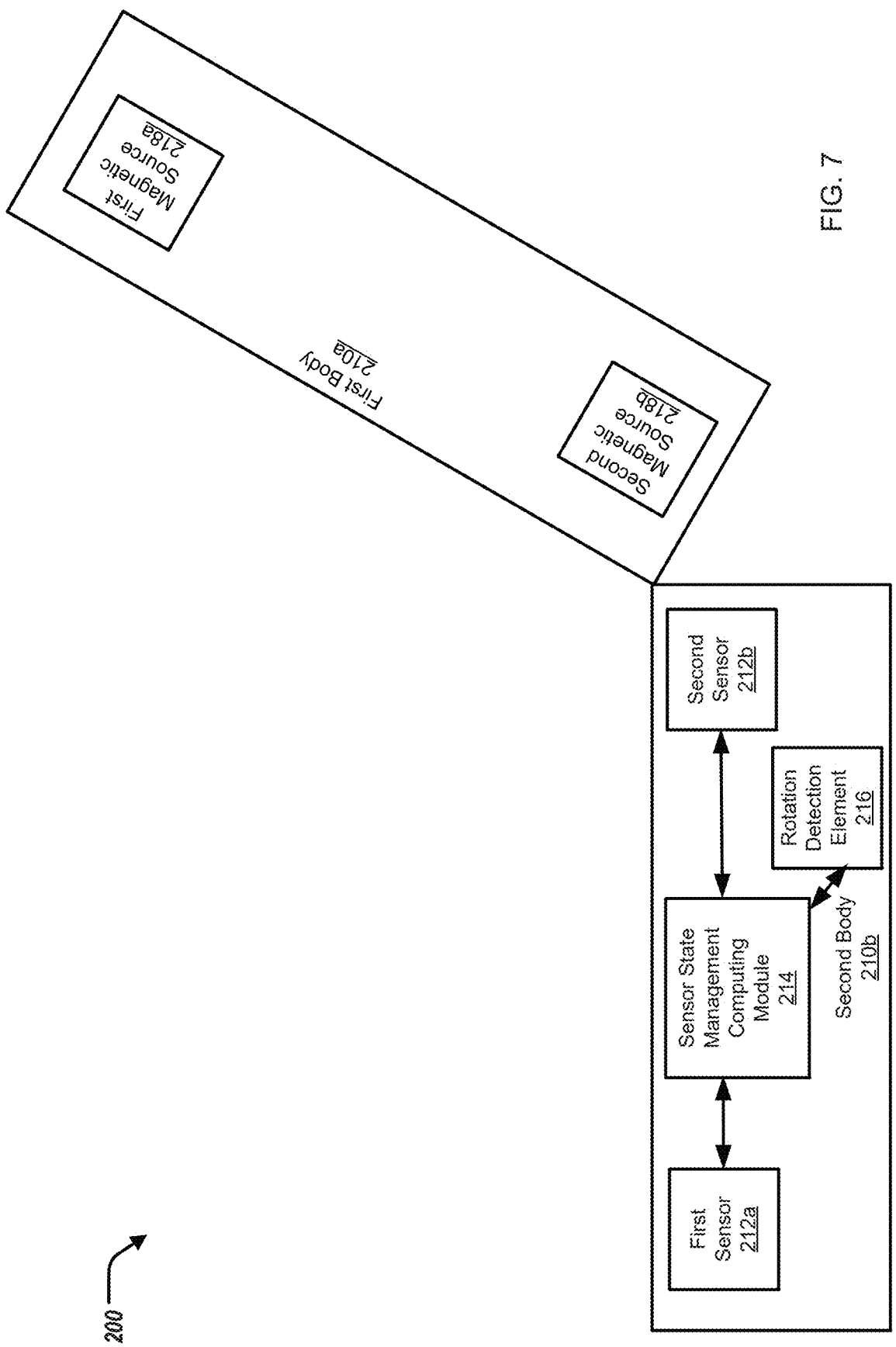
Figure 8:
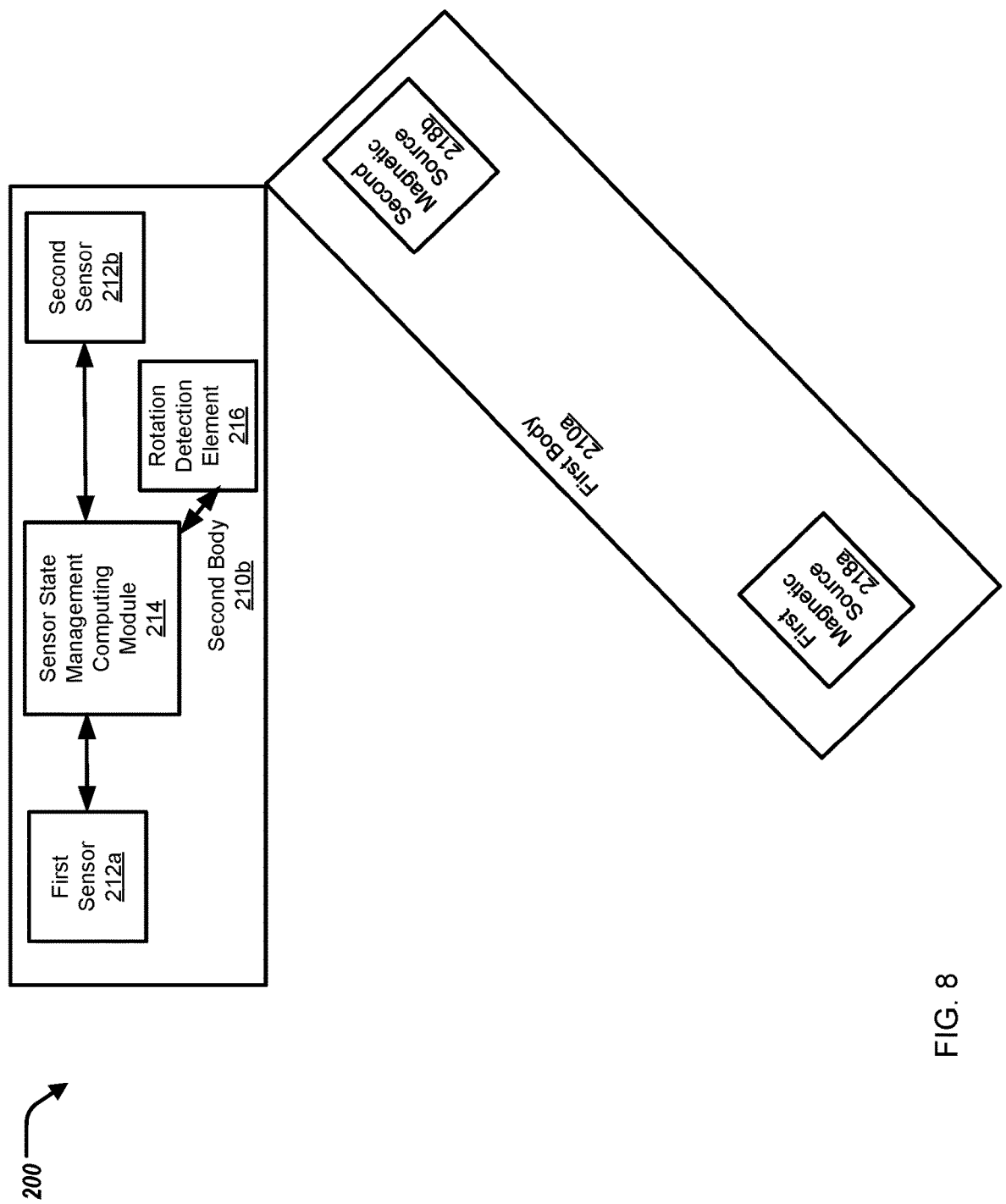

FIGS. 6, 7, and 8 illustrate rotation of the first body 210a with respect to the second body 210b, e.g., about the hinge 320.

The rotation detection element 216 detects, at a third time after the second time, a second static state of the first body 210a and the second body 210b, at 414. For example, when the rotation detection element 216 includes a gyroscope, the gyroscope detects zero, or substantially zero, angular velocity of the first body 210a and the second body 210b. That is, the first body 210a is static with respect to the second body 210b, and the second body 210b is static with respect to the first body 210a. The rotation detection element 216 can provide a signal to the sensor state management computing module 214 indicating, at the third time, the second static state of the first body 210a and the second body 210b.

In response to detecting the second static state of the first body 210a and the second body 210b, the sensor state management computing module 214 receives, from the second sensor 212b, a second signal, at 416. Specifically, the second sensor 212b detects a second magnetic field at the second sensor 212b. In particular, the second sensor 212b detects the second magnetic source 218b, and specifically, detects the second magnetic field of the second magnetic source 218b. In some examples, the second sensor 212b detects the second magnetic source 218b, and specifically, detects the second magnetic field of the second magnetic source 218b when the second magnetic source 218b is within a threshold distance of the second sensor 218b. The second sensor 212b provides the second signal to the sensor state management computing module 214 indicating the detection of the second magnetic source 218b.

Figure 9:
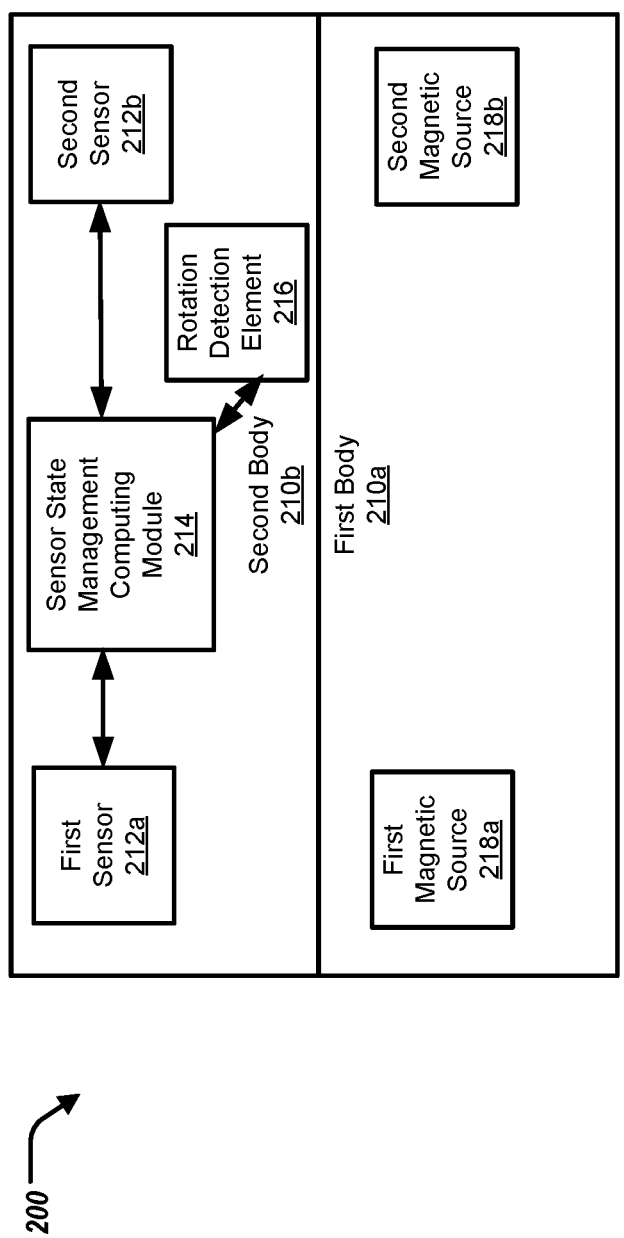

Further in response to detecting the second static state of the first body 210a and the second body 210b, the sensor state management computing module 214 determines, based on the second signal, a second positional state of the first body 210a with respect to the second body 210b, at 418. That is, when the second sensor 212b provides the second signal, and the first body 210a and the second body 210b are in the second static state, the sensor state management computing module 214 determines that the first body 210a is in the second positional state with respect to the second body 210b. That is, when the second sensor 212b provides the second signal indicating detection of the second magnetic source 218b, and the first body 210a and the second body 210b are in the second static state, the sensor state management computing module 214 determines that the first body 210a is in the second positional state with respect to the second body 210b. In some examples, the second positional state of the first body 210a with respect to the second body 210b can include a tablet positional state of the information handling system 202. FIGS. 3C and 9 illustrates the tablet positional state of the information handling system 202, and in particular, the first body 210a adjacent to the second body 210b such that there is a zero degree angle between the first body 210a and the second body 210b; and the display 310 is accessible by a user of the information handling system 202. That is, the display 310 is positioned facing away from the second body 210b, as shown in FIG. 3C. Furthermore, in the tablet positional state of the information handling system 202, the second sensor 212b is proximate to the second magnetic source 218b.

Further in response to detecting the second static state of the first body 210a and the second body 210b, the sensor state management computing module 214 disables the first sensor 212a, at 420. That is, the first sensor 212a is disabled from detecting any magnetic field, or from detecting the first magnetic source 218a. In some examples, the first sensor 212a is placed in an off-state to disable the first sensor 212a.

In some examples, the rotation detection element 216 detects, at a fourth time after the second time and before the third time, a third static state of the first body 210a and the second body 210b. That is, after rotation of the first body 210a with respect to the second body 210b and prior to the information handling system 202 being in the tablet positional state (as shown in FIG. 3C), the information handling system 202 can be in a table-top positional state, as shown in FIGS. 3A and 7. The rotation detection element 216 can provide a signal to the sensor state management computing module 214 indicating, at the fourth time, the third static state of the first body 210a and the second body 210b.

In response to detecting the third static state of the first body 210a and the second body 210b, the sensor state management computing module 214 disables the first sensor 212a and the second sensor 212b. That is, the first sensor 212a is disabled from detecting any magnetic field, or from detecting the first magnetic source 218a; and the second sensor 212b is disabled from detecting any magnetic field, or from detecting the second magnetic source 218b. In some examples, the first sensor 212a is placed in an off-state to disable the first sensor 212a; and the second sensor 212b is placed in an off-state to disable the second sensor 212b.

Figure 10:
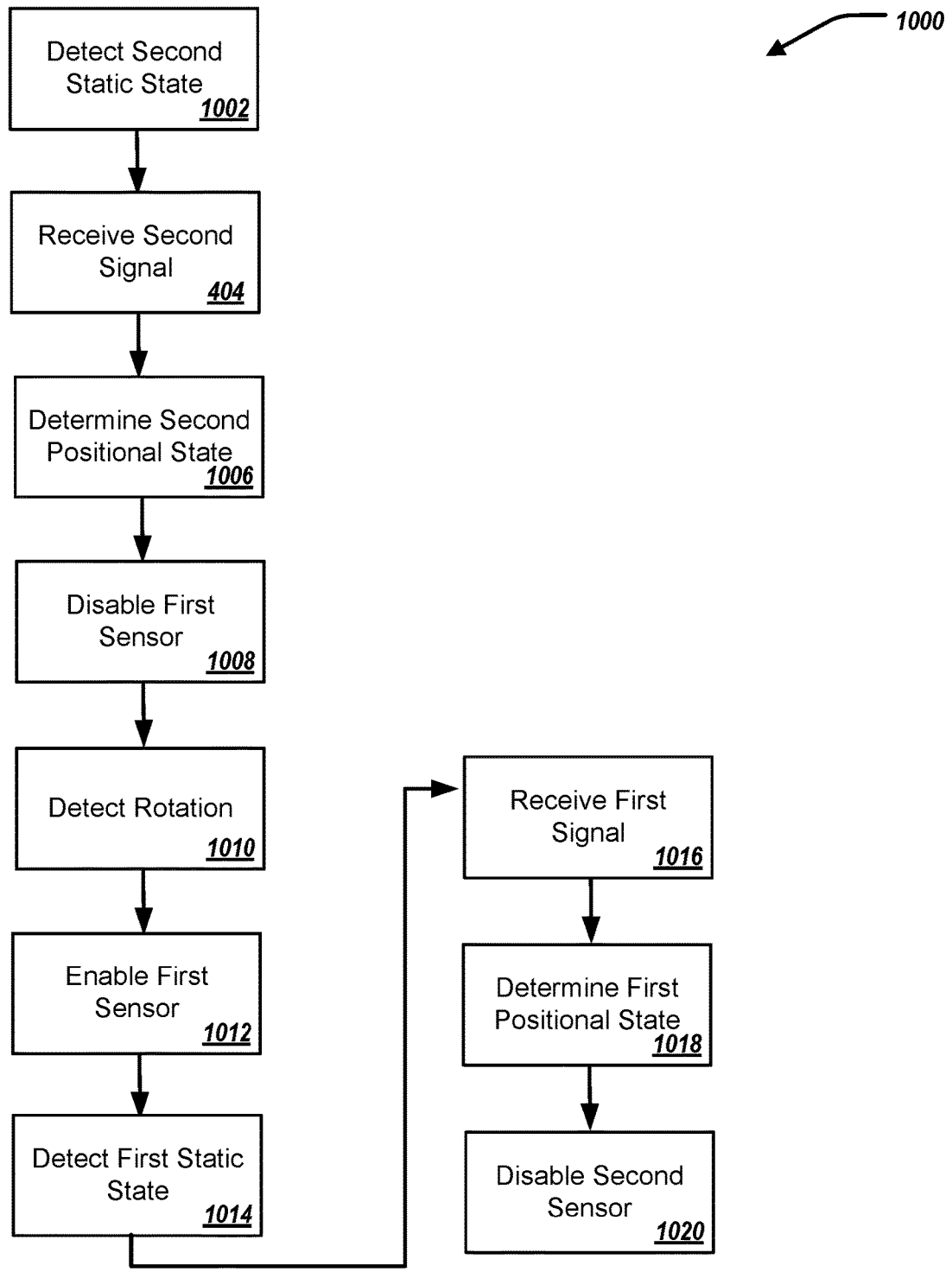
FIG. 10 illustrates a method for managing sensor states of the information handling system, in a second embodiment.

FIG. 10 illustrates a flowchart depicting selected elements of an embodiment of a method 1000 for managing sensor states of an information handling system. The method 1000 may be performed by the information handling system 100, the information handling system 202 and/or the sensor state management computing module 210, and with reference to FIGS. 1-3 and 5-9. It is noted that certain operations described in method 1000 may be optional or may be rearranged in different embodiments.

The rotation detection element 216 detects, at a fifth time, the second static state of the first body 210a and the second body 210b, at 1002. For example, when the rotation detection element 216 includes a gyroscope, the gyroscope detects zero, or substantially zero, angular velocity of the first body 210a and the second body 210b. That is, the first body 210a is static with respect to the second body 210b, and the second body 210b is static with respect to the first body 210a. The rotation detection element 216 can provide a signal to the sensor state management computing module 214 indicating, at the fifth time, the second static state of the first body 210a and the second body 210b.

In response to detecting the second static state of the first body 210a and the second body 210b, the sensor state management computing module 214 receives, from the second sensor 212b, the second signal, at 1004. Specifically, the second sensor 212b detects a second magnetic field at the second sensor 212b. In particular, the second sensor 212b detects the second magnetic source 218b, and specifically, detects the second magnetic field of the second magnetic source 218b. In some examples, the second sensor 212b detects the second magnetic source 218b, and specifically, detects the second magnetic field of the second magnetic source 218b when the second magnetic source 218b is within a threshold distance of the second sensor 212b. The second sensor 212b provides the second signal to the sensor state management computing module 214 indicating the detection of the second magnetic source 218b.

Further in response to detecting the second static state of the first body 210a and the second body 210b, the sensor state management computing module 214 determines, based on the second signal, the second positional state of the first body 210a with respect to the second body 210b, at 1006. That is, when the second sensor 212a provides the second signal, and the first body 210a and the second body 210b are in the second static state, the sensor state management computing module 214 determines that the first body 210a is in the second positional state with respect to the second body 210b. That is, when the second sensor 212b provides the second signal indicating detection of the second magnetic source 218b, and the first body 210a and the second body 210b are in the second static state, the sensor state management computing module 214 determines that the first body 210a is in the second positional state with respect to the second body 210b. In some examples, the second positional state of the first body 210a with respect to the second body 210b can include a tablet positional state of the information handling system 202. FIGS. 3C and 9 illustrates the tablet positional state of the information handling system 202, and in particular, the first body 210a adjacent to the second body 210b such that there is a zero degree angle between the first body 210a and the second body 210b; and the display 310 is accessible by a user of the information handling system 202. That is, the display 310 is positioned facing away from the second body 210b, as shown in FIG. 3C. Furthermore, in the tablet positional state of the information handling system 202, the second sensor 212b is proximate to the second magnetic source 218b.

Further in response to detecting the second static state of the first body 210a and the second body 210b, the sensor state management computing module 214 disables the first sensor 212a, at 1008. That is, the first sensor 212a is disabled from detecting any magnetic field, or from detecting the first magnetic source 218a. In some examples, the first sensor 212a is placed in an off-state to disable the first sensor 212a.

The rotation detection element 216 detects, at a sixth time after the fifth time, a rotation of the first body 210a and the second body 210b, at 1010. For example, when the rotation detection element 216 includes a gyroscope, the gyroscope detects angular velocity of the first body 210a and/or the second body 210b. That is, the first body 210a is rotated with respect to the second body 210b, and/or the second body 210b is rotated with respect to the first body 210a. The rotation detection element 216 can provide a signal to the sensor state management computing module 214 indicating, at the fifth time, rotation of the first body 210a with respect to the second body 210b.

In response to detecting the rotation of the first body 210a with respect to the second body 210b, the sensor state management computing module 214 enables the first sensor 212a, at 1012. That is, the first sensor 212a is enabled for detecting of a magnetic field, and in particular, detecting the first magnetic source 218a. In some examples, the first sensor 212a is placed in an on-state to enable the first sensor 212a.

Furthermore, in some examples, in response to detecting the rotation of the first body 210a with respect to the second body 210b, the sensor state management computing module 214 maintains the second sensor 212b as enabled. That is, the second sensor 212b is maintained as enabled for detecting of a magnetic field, and in particular, detecting the second magnetic source 218b. In some examples, the second sensor 212b is maintained in the on-state to maintain the second sensor 212b as enabled.

FIGS. 8, 7, 6 illustrate rotation of the first body 210a with respect to the second body 210b, e.g., about the hinge 320.

The rotation detection element 216 detects, at a seventh time after the sixth time, the first static state of the first body 210a and the second body 210b, at 1014. For example, when the rotation detection element 216 includes a gyroscope, the gyroscope detects zero, or substantially zero, angular velocity of the first body 210a and the second body 210b. That is, the first body 210a is static with respect to the second body 210b, and the second body 210b is static with respect to the first body 210a. The rotation detection element 216 can provide a signal to the sensor state management computing module 214 indicating, at the seventh time, the first static state of the first body 210a and the second body 210b.

In response to detecting the first static state of the first body 210a and the second body 210b, the sensor state management computing module 214 receives, from the first sensor 212a, the first signal, at 1016. Specifically, the first sensor 212a detects a first magnetic field at the first sensor 212a. In particular, the first sensor 212a detects the first magnetic source 218a, and specifically, detects the first magnetic field of the first magnetic source 218a. In some examples, the first sensor 212a detects the first magnetic source 218a, and specifically, detects the first magnetic field of the first magnetic source 218a when the first magnetic source 218a is within a threshold distance of the first sensor 218a. The first sensor 212a provides the first signal to the sensor state management computing module 214 indicating the detection of the first magnetic source 218a.

Further in response to detecting the first static state of the second body 210a and the second body 210b, the sensor state management computing module 214 determines, based on the first signal, the first positional state of the second body 210a with respect to the second body 210b, at 1018. That is, when the first sensor 212a provides the first signal, and the first body 210a and the second body 210b are in the first static state, the sensor state management computing module 214 determines that the first body 210a is in the first positional state with respect to the second body 210b. That is, when the first sensor 212a provides the first signal indicating detection of the first magnetic source 218a, and the first body 210a and the second body 210b are in the first static state, the sensor state management computing module 214 determines that the first body 210a is in the first positional state with respect to the second body 210b. In some examples, the first positional state of the first body 210a with respect to the second body 210b can include a closed positional state of the information handling system 202. FIGS. 3B and 5 illustrates the closed positional state of the information handling system 202, and in particular, the first body 210a adjacent to the second body 210b such that there is a zero degree angle between the first body 210a and the second body 210b. Furthermore, in the closed positional state of the information handling system 202, the first sensor 212a is proximate to the first magnetic source 218a.

Further in response to detecting the first static state of the first body 210a and the second body 210b, the sensor state management computing module 214 disables the second sensor 212b, at 1020. That is, the second sensor 212a is disabled from detecting any magnetic field, or from detecting the second magnetic source 218b. In some examples, the second sensor 212b is placed in an off-state to disable the second sensor 212b.

In some examples, the rotation detection element 216 detects, at an eighth time after the sixth time and before the seventh time, the static state of the first body 210a and the second body 210b. That is, after rotation of the first body 210a with respect to the second body 210b and prior to the information handling system 202 being in the closed positional state (as shown in FIG. 3A), the information handling system 202 can be in a table-top positional state, as shown in FIGS. 3A and 7. The rotation detection element 216 can provide a signal to the sensor state management computing module 214 indicating, at the eighth time, the third static state of the first body 210a and the second body 210b.

In response to detecting the third static state of the first body 210a and the second body 210b, the sensor state management computing module 214 disables the first sensor 212a and the second sensor 212b. That is, the first sensor 212a is disabled from detecting any magnetic field, or from detecting the first magnetic source 218a; and the second sensor 212b is disabled from detecting any magnetic field, or from detecting the second magnetic source 218b. In some examples, the first sensor 212a is placed in an off-state to disable the first sensor 212a; and the second sensor 212b is placed in an off-state to disable the second sensor 212b.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing sensor states of an information handling system, including:
    detecting, at a first time, a first static state of a first body and a second body of the information handling system, the first body coupled to the second body via a hinge;
    in response to detecting the first static state of the first body and the second body of the information handling system:
        receiving, from a first sensor of a pair of sensors of the information handling system, a first signal,
        determining, based on the first signal, a first positional state of the first body with respect to the second body of the information handling system, and
        disabling the second sensor from the pair of sensors;
    detecting, at a second time after the first time, a rotation of the first body with respect to the second body;
    in response to detecting the rotation of the first body with respect to the second body:
        enabling the second sensor from the pair of sensors; and
    detecting, at a third time after the second time, a second static state of the first body and the second body of the information handling system;
    in response to detecting the second static state of the first body and the second body of the information handling system:
        receiving, from the second sensor of the pair of sensors, a second signal;
        determining, based on the second signal, a second positional state of the first body with respect to the second body of the information handling system; and
        disabling the first sensor from the pair of sensors.

2. The computer-implemented method of claim 1, wherein in response to detecting the rotation of the first body with respect to the second body, maintaining the first sensor as enabled.

3. The computer-implemented method of claim 1, further including:
    detecting, at a fourth time after the second time and before the third time, a third static state of the first body and the second body;
    in response to detecting the third static state of the first body and the second body:
        disabling the first and the second sensors.

4. The computer-implemented method of claim 1,
    wherein the first positional state of the first body with respect to the second body includes a closed positional state of the information handling system, and
    wherein the second positional state of the first body with respect to the second body includes a tablet positional state of the information handling system.

5. The computer-implemented method of claim 1,
    wherein the first positional state of the first body with respect to the second body includes a tablet positional state of the information handling system, and
    wherein the second positional state of the first body with respect to the second body includes a closed positional state of the information handling system.

6. The computer-implemented method of claim 1, wherein receiving the first signal further includes receiving the first signal indicating a detection of a first magnetic field at the first sensor.

7. The computer-implemented method of claim 1, wherein receiving the second signal further includes receiving the second signal indicating a detection of a second magnetic field at the second sensor.

8. An information handling system comprising:
    a first body, including:
        a first magnetic source;
        a second magnetic source;
    a second body coupled to the first body via a hinge, including:
        a rotation detection element configured to:
            detect, at a first time, a first static state of the first body and the second body;
            detect, at a second time after the first time, a rotation of the first body with respect to the second body a first sensor configured to detect the first magnetic source;
            detect, at a third time after the second time, a second static state of the first body and the second body;
        a first sensor configured to detect the first magnetic source;
        a second sensor configured to detect the second magnetic source;
    a processor having access to memory media storing instructions executable by the processor to perform operations, comprising:
        in response to the rotation detection element detecting the first static state of the first body and the second body:
            receiving, from the first sensor, a first signal indicating detection of the first magnetic source by the first sensor;
            determining, based on the first signal, a first positional state of the first body with respect to the second body, and
            disabling the second sensor;
        in response to the rotation detection element detecting the rotation of the first body with respect to the second body:
            enabling the second sensor;
        in response to the rotation detection element detecting the second static state of the first body and the second body:
            receiving, from the second sensor, a second signal indicating detection of the second magnetic source by the second sensor;
            determining, based on the second signal, a second positional state of the first body with respect to the second body; and
            disabling the first sensor.

9. The information handling system of claim 8, wherein the first sensor and the second sensor are Hall effect sensors.

10. The information handling system of claim 8, wherein the first sensor and the second sensor are giant magnetoresistance (GMR) sensors.

11. The information handling system of claim 8, wherein in response to the rotation detection element detecting the rotation of the first body with respect to the second body, maintaining the first sensor as enabled.

12. The information handling system of claim 8,
wherein the rotation detection element is further configured to detect, at a fourth time after the second time and before the third time, a third static state of the first body and the second body,
wherein the operations further include in response to the rotation detection element detecting the third static state of the first body and the second body:
disabling the first and the second sensors.

13. The information handling system of claim 8,
wherein the first positional state of the first body with respect to the second body includes a closed positional state of the information handling system, and
wherein the second positional state of the first body with respect to the second body includes a tablet positional state of the information handling system.

14. The information handling system of claim 8,
wherein the first positional state of the first body with respect to the second body includes a tablet positional state of the information handling system, and
wherein the second positional state of the first body with respect to the second body includes a closed positional state of the information handling system.

15. A non-transitory computer-readable medium storing software comprising instructions executable by one or more computers which, upon such execution, cause the one or more computers to perform operations comprising:
detecting, at a first time, a first static state of a first body and a second body of the information handling system, the first body coupled to the second body via a hinge;
in response to detecting the first static state of the first body and the second body of the information handling system:
receiving, from a first sensor of a pair of sensors of the information handling system, a first signal,
determining, based on the first signal, a first positional state of the first body with respect to the second body of the information handling system, and
disabling the second sensor from the pair of sensors;
detecting, at a second time after the first time, a rotation of the first body with respect to the second body;
in response to detecting the rotation of the first body with respect to the second body:
enabling the second sensor from the pair of sensors; and
detecting, at a third time after the second time, a second static state of the first body and the second body of the information handling system;
in response to detecting the second static state of the first body and the second body of the information handling system:
receiving, from the second sensor of the pair of sensors, a second signal;
determining, based on the second signal, a second positional state of the first body with respect to the second body of the information handling system; and
disabling the first sensor from the pair of sensors.

16. The non-transitory computer-readable medium of claim 15, wherein in response to detecting the rotation of the first body with respect to the second body, maintaining the first sensor as enabled.

17. The non-transitory computer-readable medium of claim 15, the operations further include:
detecting, at a fourth time after the second time and before the third time, a third static state of the first body and the second body;
in response to detecting the third static state of the first body and the second body:
disabling the first and the second sensors.

18. The non-transitory computer-readable medium of claim 15,
wherein the first positional state of the first body with respect to the second body includes a closed positional state of the information handling system, and
wherein the second positional state of the first body with respect to the second body includes a tablet positional state of the information handling system.

19. The non-transitory computer-readable medium of claim 15,
wherein the first positional state of the first body with respect to the second body includes a tablet positional state of the information handling system, and
wherein the second positional state of the first body with respect to the second body includes a closed positional state of the information handling system.

20. The non-transitory computer-readable medium of claim 15, wherein receiving the first signal further includes receiving the first signal indicating a detection of a first magnetic field at the first sensor.

* * * * *